May 15, 1945.  C. E. SLAUGHTER  2,375,827
EXTRUDED PLASTIC SECTION
Filed Aug. 20, 1941
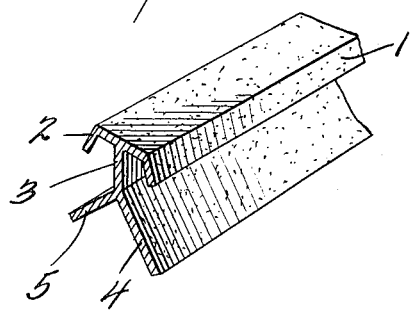
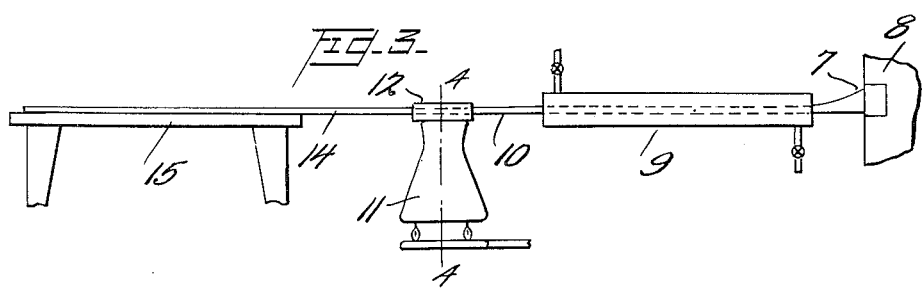
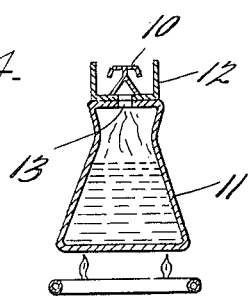
Inventor
Charles E. Slaughter,
By Sol Shappirio
Attorney Patented May 15, 1945

2,375,827

UNITED STATES PATENT OFFICE 2,375,827

EXTRUDED PLASTIC SECTION

Charles E. Slaughter, New Canaan, Conn., assignor to Extruded Plastics, Inc., Norwalk, Conn., a corporation of Connecticut Application August 20, 1941, Serial No. 407,667

7 Claims. (Cl. 18—48)

This invention relates to extruded plastic sections, particularly elongated sections or strips and methods of making the same.

In the extrusion of thermoplastic materials in the production of elongated sections or products such as are used for wall board trim, upon extrusion and cooling of the section, the latter tends to curve or warp which is particularly noticeable in long sections, as for example, of a length of ten or more feet. Such curvature renders the material useless for commercial work. Such curvature or warpage is particularly pronounced in non-uniform sections, that is, in extruded sections which in cross-section are not uniform or which are of such character that cooling takes place unequally in various portions of the section, so that unequal strains are set up during the cooling process causing serious warpage. In a non-uniform cross-section, the heavy section will contract to a greater extent than the lighter section, with the result that bowing occurs. Moreover, if one face is cooled more quickly than the other, bowing will also result.

Among the objects of the present invention is the production of such extruded plastic sections in any desired length which are free from undesired curvature or warpage.

Still further objects include methods of producing extruded plastic sections free from internal strain.

Other and further objects of the invention will appear from the more detailed description set forth below, it being understood, however, that this more detailed description is given by way of illustration and explanation only, and not by way of limitation, since various changes may be made therein by those skilled in the art without departing from the scope and spirit of the present invention.

In connection with that more detailed description, there is shown in the drawing, in Figure 1, a perspective view of one form of extruded plastic trim; in Figure 2, a side elevation of an extruded plastic strip showing bowing or warpage; in Figure 3, a side elevation of an apparatus for producing extruded thermoplastic sections free from warpage, internal strains, or undesired bowing; and in Figure 4, a transverse section on the lines 4—4 of Figure 3.

In accordance with the present invention, it is feasible to produce extruded plastic sections of varying cross-section, and in any desired length such as 10, 12 and 14 foot lengths, without undesired curvature or warpage or internal strain. While the methods of the present invention may be applied to extruded plastic sections of elongated lengths, etc., after the extruded product has taken up its permanent set, which usually occurs within a few hours of extrusion, the straightening of such permanently set sections is troublesome and involved, and preferably therefore, the methods of the present invention are applied to the production of extruded plastic sections of elongated type shortly after the section has been extruded and before it has assumed its permanent set since in this way the product is produced free from undesired curvature or warpage by simple and economical methods which become really part of the extrusion process itself, the total time involved for producing such desirable extruded plastic sections being only a matter of a few seconds.

In accordance with this invention it has been found that the extruded product is treated shortly after it leaves the extruding machine by the application of heat or heat and high humidity, applied desirably to the convex section of the bow as a result of which it is found that the extruded plastic section is substantially free from strains and bowing or warpage. The application of such heat with or without humidity, is applied to the extruded product while it is being cooled, preferably just after it leaves the extruding machine and the application of heat or heat and humidity may be made to the extruded product as part of the complete process of producing such extruded sections.

The invention will be illustrated in connection with the production of an extruded plastic strip, section or trim material as illustrated in Figure 1. In such sections, unequal strains are set up during the cooling process because the cooling is not uniform from the various sections or portions of the extruded plastic material. For example, where the smaller flanges 1 and 2 and vertical flange 3 considerably outweigh the side portions or legs 4. 5, direct extrusion of such product in relative long lengths results in a warped section as shown in Figure 2, from which the bow 6 is removed only with difficulty if treatment is made after the material has obtained its permanent set. Such warpage or undesired bowing or curvature takes place in any sections where unequal cooling appears, and the type of section illustrated in Figure 1 is merely exemplary in this connection.

In order to produce elongated extruded sections, as for example, in lengths of 10, 12 and 14 foot lengths or longer, free from strain, bowing, or undesired curvature, the product is desirably treated as illustrated in the apparatus shown in Figure 3. As there illustrated, the extruded product emerges at 7 from the extruding machine 8 and passes directly into the cooling trough 9 in which water may be circulating. The material as it leaves the extruding machine is at an elevated temperature, as for example, in the neighborhood of 400° F. and higher where thermoplastic material such as cellulose acetobutyrate is being extruded. It is partially cooled in the cooling trough 9 by the circulating water, and emerges therefrom at 10 at which point it is desirably subjected to the heat treatment in accordance with the present invention. For this purpose, the elongated section at 10 passes into a heating zone provided by the kettle 11. The extruded plastic passes into the trough 12, supported on top of the kettle 11, there being an elongated opening 13 in the bottom of the trough for reception of wet steam generated in the kettle 11. This wet steam is applied to the under side or convex section of the extruded plastic 10. A simple application of heat or preferably heat and humidity such as that supplied by wet steam is sufficient to insure that the extruded section will be uniform, free from warpage, bowing and internal strains. The extruded material emerges from the heating trough 12 at 14 and passes to the support or table 15, at which point it may cut into the desired length as it is being extruded.

The whole operation as described above, occupies only a few seconds from the time that the material is extruded from the die of the extruding machine 8 and is received on the support or table 15. The application of heat or heat and humidity as by the kettle 11 to the extruded strip is applied shortly after the material leaves the extruding machine and preferably just after it has been given an initial cooling treatment as in the cooling trough 9. At this time, which is only a few seconds desirably after the material has left the extruding machine, it has not yet taken its permanent set and the application of the after heat treatment, preferably with moisture, results in the extrusion of the product at 14 in the form of a substantially straight section free from internal strains, warpage, or bowing. The freedom from internal strains is readily demonstrated by examining a portion of extruded section produced as explained above, which extruded section is of translucent or transparent material, examining such extruded section between "polaroid" lenses. A product examined in this way shows no interference fringes or colors evidencing its freedom from internal strains.

As noted above, the application of heat or heat and humidity to the extruded section is desirably carried out as part of the extrusion process while the product is being cooled down after leaving the extrusion machine. It is desirably made before the material has permanently set. While permanently set material (such permanent set usually takes place several hours after extrusion) can be treated and straightened by the application of heat preferably with humidity, it is a much more difficult and laborious process than the utilization of the heat or heat and moisture treatment immediately after extrusion of the product and before permanent set has taken place, and consequently the latter operation is much to be preferred.

While the invention has been illustrated in connection with the extrusion of sections made from the thermoplastic material cellulose acetobutyrate, it is equally applicable to such extruded products produced from other thermoplastic substances, as for example, any of the synthetic resins of the thermoplastic type, particularly cellulose derivatives such as the esters including cellulose acetate and cellulose acetobutyrate, the ethers such as ethyl cellulose, polymerized vinyl materials and other resinous compositions that may be extruded in continuous lengths. The extruded material may be of any desired color since the thermoplastic lends itself to dyeing, tinting or pigmenting as preferred.

The amount of heat or heat and humidity applied depends on various factors including the size of the section undergoing treatment and also upon the temperature variation, that is, the difference between the temperature of the surface of the material and the temperature applied for the straightening process. These factors influence the amount of heat and humidity to be applied but this can be readily determined by simple tests. If desired, the amount of heat and humidity applied can be such as not only to produce a straight product where this is sought, but further application of heat and humidity or more intense heat enables the production of products which are bowed or arched in the opposite direction where such products may be desired.

The term "permanent set" as used herein is intended to refer to the change which takes place after extrusion. For instance after extrusion there is a comparatively rapid shrinkage which occurs over a period of approximately twenty-four hours. After this period, the material seems to settle down or "set." The sooner the heat application as referred to above, the quicker is the straightening process. When applied immediately after the plastic leaves the machine, the operation takes only a second or two; if applied after a couple of hours, minutes are needed.

Having thus set forth my invention, I claim:

1. The method of preventing warping or bowing during extrusion of an elongated synthetic resinous thermoplastic rod-like section which comprises extruding a continuous elongated synthetic resinous thermoplastic in heated plastic condition to form a rod-like section which will warp or bow on cooling if not treated and promptly after extrusion and before permanent set of the product partially cooling the section and subjecting it to a brief reheating applied successively to a short portion of the section at a temperature below fusion the extrusion, cooling and reheating steps being carried out in substantially straight line operation whereby a straight elongated section is obtained.

2. The method of producing straight elongated thermoplastic rod-like sections free from internal strain in extruded sections which on extrusion warp or bow, which method comprises extruding a continuous elongated synthetic resinous thermoplastic in heated plastic condition to form a rod-like trim section which will warp or bow on cooling if not treated, and promptly after extrusion and before permanent set of the product, partially cooling the extruded product by immersion in water, removing the product from the water and subjecting it to a brief reheating applied successively to a short portion of the section at a temperature below fusion whereby a straight elongated section free from internal strain is obtained.

3. A process as set forth in claim 2, in which the reheating is carried out with wet steam applied directly to the extruded section.

4. The method of producing straight elongated thermoplastic rod-like sections free from internal strain in extruded sections which on extrusion warp or bow, which comprises extruding a continuous elongated synthetic resinous thermoplastic in heated plastic condition to form a rod-like trim section of non-uniform cross-sectional shape which will warp or bow on cooling if not treated, and immediately after leaving the extruding die while the product is being cooled down and before permanent set, subjecting it to a brief reheating by wet steam applied successively to a short portion of the section at a temperature below fusion whereby a straight elongated section free from internal strain is obtained.

5. A method as set forth in claim 2, in which the reheating is applied along the face opposite to that of the anticipated warp or bow.

6. The method of preventing warping or bowing during extrusion of an elongated synthetic resinous thermoplastic rod-like section which comprises extruding a continuous elongated synthetic resinous thermoplastic in heated plastic condition to form a rod-like section which will warp or bow on cooling if not treated and promptly after extrusion and before permanent set of the product partially cooling the section and subjecting it to a brief reheating applied successively to a short portion of the section at a temperature below fusion by wet stem applied directly to the extruded section, whereby a straight elongated section is obtained.

7. The method of preventing warping or bowing during extrusion of an elongated synthetic resinous thermoplastic rod-like section which comprises extruding a continuous elongated synthetic resinous thermoplastic in heated plastic condition to form a rod-like section which will warp or bow on cooling if not treated and promptly after extrusion and before permanent set of the product partially cooling the section and subjecting it to a brief reheating applied successively to a short portion of the section along the face opposite to that of the anticipated warp or bow at a temperature below fusion whereby a straight elongated section is obtained.

CHARLES E. SLAUGHTER.